US012736688B2

(12) United States Patent
Yurugi et al.

(10) Patent No.: US 12,736,688 B2
(45) Date of Patent: Sep. 15, 2026

(54) X-RAY INSPECTION APPARATUS

(71) Applicant: ISHIDA CO., LTD., Kyoto (JP)

(72) Inventors: Futoshi Yurugi, Ritto (JP); Yoshiaki Sakagami, Ritto (JP); Atsushi Yamakawa, Ritto (JP); Kota Tominaga, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 144 days.

(21) Appl. No.: 18/584,859

(22) Filed: Feb. 22, 2024

(65) Prior Publication Data

US 2024/0288592 A1 Aug. 29, 2024

(30) Foreign Application Priority Data

Feb. 28, 2023 (JP) ................................ 2023-029865

(51) Int. Cl.
*G01N 23/04* (2018.01)
*G01T 1/175* (2006.01)

(52) U.S. Cl.
CPC ............. *G01T 1/175* (2013.01); *G01N 23/04* (2013.01); *G01N 2223/1016* (2013.01); *G01N 2223/3103* (2013.01); *G01N 2223/643* (2013.01)

(58) Field of Classification Search
None
See application file for complete search history.

(56) References Cited

U.S. PATENT DOCUMENTS

2004/0109538 A1* 6/2004 McCarthy, Jr. ...... A61B 6/4488 378/141
2019/0297717 A1* 9/2019 Kondo .................. G01N 23/04

FOREIGN PATENT DOCUMENTS

CN 115568130 A 1/2023
EP 4394457 A1 7/2024
JP 2019164088 A 9/2019

OTHER PUBLICATIONS

Kasprowicz Grzegorz et al. “Multichannel Data Acquisition System for GEM Detectors”, Journal of Fusion Energy, Plenum Pub. Corporation. New York, US, Jun. 21, 2018, p. 467-p. 479, XP036839054 (Year: 2018).*
Extended Search Report in the corresponding European Patent Application No. 24159353.2 dated Jul. 12, 2024.
Kasprowicz Grzegorz et al, “Multichannel Data Acquisition System for GEM Detectors”, Journal of Fusion Energy, Plenum Pub. Corporation. New York, US, Jun. 21, 2018, p. 467-p. 479, XP036839054.

* cited by examiner

*Primary Examiner* — Hoon K Song
(74) *Attorney, Agent, or Firm* — Spencer Fane LLP

(57) ABSTRACT

An X-ray inspection apparatus includes: a conveyance unit; an X-ray irradiation unit that irradiates an article conveyed by the conveyance unit with an X-ray; an X-ray detection unit that detects the X-ray that has transmitted through the article; an inspection unit that generates an X-ray transmission image from the X-ray detected by the X-ray detection unit and inspects the article on the basis of the X-ray transmission image; a housing that houses the X-ray irradiation unit and the X-ray detection unit; a cold air blower that cools air in the housing and guides cold air to the X-ray detection unit via a duct; a monitoring unit that monitors a state of the cold air blower; and a control unit that stops the supply of electric power to the X-ray detection unit in a case where an abnormality in the cold air blower is detected in the monitoring unit.

3 Claims, 9 Drawing Sheets

X-RAY INSPECTION APPARATUS

TECHNICAL FIELD

The present invention relates to an X-ray inspection apparatus.

BACKGROUND

An X-ray inspection apparatus includes a conveyance unit that conveys an article, an X-ray irradiation unit that irradiates the article conveyed by the conveyance unit with an X-ray, and an X-ray detection unit that detects the X-ray that has transmitted through the article. An X-ray inspection apparatus described in Patent Literature 1 (Japanese Unexamined Patent Publication No. 2019-164088) includes an air guide part that guides cold air supplied from a cold air blower to at least part of an X-ray detection unit via a duct, and the X-ray detection unit is cooled.

SUMMARY

In a configuration in which the X-ray detection unit is cooled, as in the X-ray inspection apparatus described above, the X-ray detection unit is not sufficiently cooled when some abnormality (defect) occurs in a cold air function of the cold air blower or the like. In this state, when the X-ray detection unit continues operation (detection processing), the X-ray detection unit has a high temperature. When the X-ray detection unit has a high temperature, a defect may occur.

An object of one aspect of the present invention is to provide an X-ray inspection apparatus capable of suppressing the occurrence of a defect in an X-ray detection unit in a configuration in which the X-ray detection unit is cooled.

An X-ray inspection apparatus according to one aspect of the present invention includes: a conveyance unit that conveys an article; an X-ray irradiation unit that irradiates the article conveyed by the conveyance unit with an X-ray; an X-ray detection unit that detects the X-ray that has transmitted through the article; an inspection unit that generates an X-ray transmission image from the X-ray detected by the X-ray detection unit and inspects the article on the basis of the X-ray transmission image; a housing that houses the X-ray irradiation unit and the X-ray detection unit; a cold air blower that cools air in the housing and guides cold air to the X-ray detection unit via a duct; a monitoring unit that monitors a state of the cold air blower; and a control unit that stops the supply of electric power to the X-ray detection unit in a case where the monitoring unit detects an abnormality in the cold air blower.

In the X-ray inspection apparatus according to the one aspect of the present invention, in a case where an abnormality in the cold air blower is detected in the monitoring unit, the control unit stops the supply of the electric power to the X-ray detection unit. For example, the control unit stops (cuts off) the supply of electric power from a power supply of the X-ray inspection apparatus to the X-ray detection unit or in a case where the X-ray detection unit includes a power supply unit, the control unit turns off a power supply of the power supply unit to stop the supply of the electric power to the X-ray detection unit. As a result, in the X-ray inspection apparatus, it is possible to suppress that the X-ray detection unit has a high temperature because even if some abnormality occurs in the cold air blower and the cold air can no longer be supplied from the cold air blower, the operation of the X-ray detection unit is stopped. Therefore, in the X-ray inspection apparatus, it is possible to suppress the occurrence of a defect in the X-ray detection unit in a configuration in which the X-ray detection unit is cooled.

In one embodiment, a cold air blower may cool air in a housing by inside air circulation to generate cold air, a discharge unit that discharge water generated in the housing to the outside of the housing is included, and the discharge unit may have a sealing part or a check valve that suppress the inflow of outside air into the housing. In a configuration in which the X-ray detection unit is cooled, the cold air supplied from the cold air blower is dehumidified by heat exchange when the air is cooled. Accordingly, an environment where the X-ray detection unit to which the cold air is guided, a member around the X-ray detection unit, and the like (for example, sensor box and the like) are disposed is in a low humidity state (dry state). In this state, when insufficiently cooled air (moisture-containing air) is guided to the X-ray detection unit whose temperature is lowered, dew condensation may occur on the X-ray detection unit, the member around the X-ray detection unit, and the like.

In a configuration including the sealing part or the check valve in the X-ray inspection apparatus, it is possible to suppress the inflow of air having a high temperature and humidity into the housing via the discharge unit. Therefore, in the X-ray inspection apparatus, it is possible to suppress the occurrence of dew condensation on the X-ray detection unit, the member around the X-ray detection unit, and the like due to the air. Therefore, in the X-ray inspection apparatus, it is possible to suppress the ingress of water generated by dew condensation into the X-ray detection unit. As a result, in the X-ray inspection apparatus, it is possible to suppress the occurrence of a defect in the X-ray detection unit in the configuration in which the X-ray detection unit is cooled.

In the one embodiment, in a case where a monitoring unit detects an abnormality in the cold air blower, blowing of air to the X-ray detection unit may be stopped. In this configuration, in a case where any abnormality occurs in the cold air blower and the cold air can no longer be supplied from the cold air blower, the insufficiently cooled air is not guided to the X-ray detection unit. Accordingly, in the X-ray inspection apparatus, it is possible to suppress the occurrence of dew condensation on the X-ray detection unit and the like. Therefore, in the X-ray inspection apparatus, it is possible to suppress the ingress of water generated by dew condensation into the X-ray detection unit. As a result, in the X-ray inspection apparatus, it is possible to suppress the occurrence of a defect in the X-ray detection unit in the configuration in which the X-ray detection unit is cooled.

According to the one aspect of the present invention, it is possible to suppress the occurrence of a defect in the X-ray detection unit in the configuration in which the X-ray detection unit is cooled.

DETAILED DESCRIPTION

Figure 1:
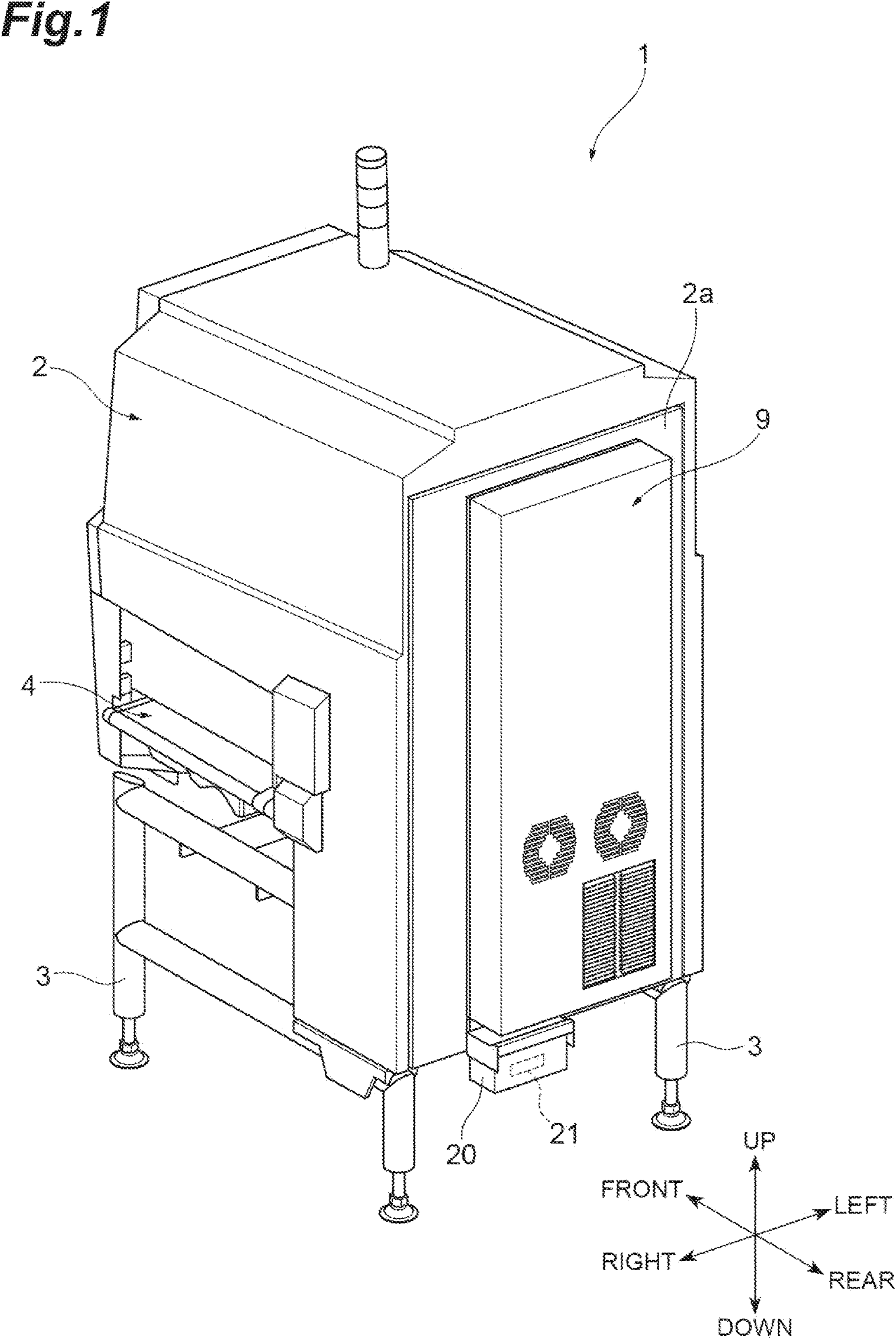
FIG. 1 is a perspective view illustrating an appearance of an X-ray inspection apparatus according to an embodiment.

Hereinafter, preferred embodiments of the present invention will be described in detail with reference to the accompanying drawings. Note that in the description of the drawings, the same or corresponding elements are denoted by the same reference signs, and redundant description is omitted. In FIGS. 1, 2, 3, and 5, "up", "down", "left", "right", "front", and "rear" directions are set for convenience of description, but the embodiments are not limited to these directions.

As illustrated in FIGS. 1 to 4, an X-ray inspection apparatus 1 includes a housing 2, a support leg 3, a conveyance unit 4, an X-ray irradiation unit 5, an X-ray detection unit 6, a display operation unit 7, a control unit (inspection unit) 8, a cold air blower 9, and a power supply unit 10. The X-ray inspection apparatus 1 generates an X-ray transmission image of an article G while conveying the article G and conducts an inspection of the article G (for example, inspection of the number of housed articles, foreign matter mixing inspection, defective article inspection, crack and chip inspection, and the like) on the basis of the X-ray transmission image.

The housing 2 houses the conveyance unit 4, the X-ray irradiation unit 5, the X-ray detection unit 6, the control unit 8, and the power supply unit 10. An inspection region R where the article G is inspected by an X-ray is provided inside the housing 2. The support leg 3 supports the housing 2. The conveyance unit 4 conveys the article G along a conveyance direction A. The conveyance unit 4 is, for example, a belt conveyor.

The X-ray irradiation unit 5 irradiates the article G conveyed by the conveyance unit 4 with the X-ray. The X-ray irradiation unit 5 is provided with a fan 11 behind the X-ray irradiation unit 5.

The X-ray detection unit 6 is a sensor 12 that detects an electromagnetic wave. The X-ray detection unit 6 may be capable of detecting an X-ray in a specific energy band or may be capable of detecting an X-ray by a photon counting method. The X-ray detection unit 6 may be a direct conversion type detection unit or an indirect conversion type detection unit. In the present embodiment, the X-ray detection unit 6 is a direct conversion type detection unit capable of detecting an X-ray by a photon counting method and includes, for example, a sensor (multi-energy sensor) that detects an X-ray in each of a plurality of energy bands that transmits through the article G. The sensors are arranged, for example, at least in a direction (width direction) orthogonal to the conveyance direction A of the conveyance unit 4 and orthogonal to an up-and-down direction. The sensors may be arranged not only in the width direction but also in the conveyance direction A. In other words, the X-ray detection unit 6 may include a line sensor or may include a sensor group disposed two-dimensionally. The sensor 12 is, for example, a photon detection type sensor such as a CdTe semiconductor detector.

In the present embodiment, the X-ray detection unit 6 is configured as an X-ray detection unit 13 with a control board (not illustrated) added to the sensor 12. The X-ray detection unit 13 is housed in a sensor box 14. The sensor box 14 is a rectangular parallelepiped housing that houses the X-ray detection unit 6. A slit 14A through which the X-ray emitted from the X-ray irradiation unit 5 passes is provided on an upper surface of the sensor box 14. An opening (not illustrated) is provided on a front surface of the sensor box 14. An opening (not illustrated) is provided on a rear surface of the sensor box 14.

A power supply of the X-ray detection unit 13 (X-ray detection unit 6) according to the present embodiment is turned on and off according to the supply of electric power from the power supply unit 10. The X-ray detection unit 13 does not have a function of turning on and off the power supply of the X-ray detection unit 13. When the X-ray detection unit 13 is supplied with the electric power from the power supply unit 10, the power supply of the X-ray detection unit 13 is turned on (activated). As a result, the X-ray detection unit 6 starts operation (detection processing). When the supply of the electric power from the power supply unit 10 is stopped, the power supply of the X-ray detection unit 13 is turned off. As a result, the X-ray detection unit 6 stops (ends) the operation.

Figure 5:
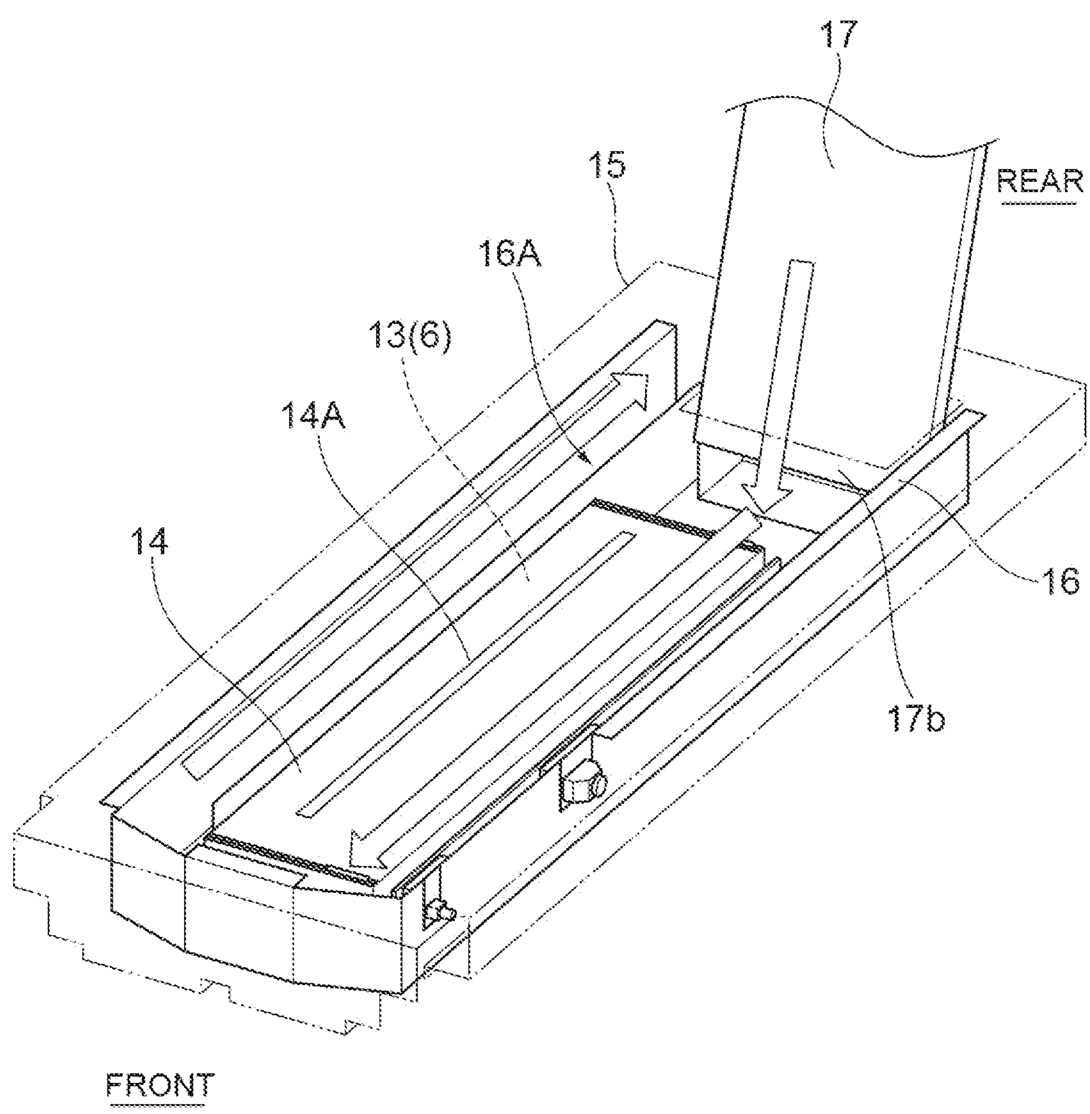
FIG. 5 is a perspective view illustrating a housing part and a duct.
Figure 6:
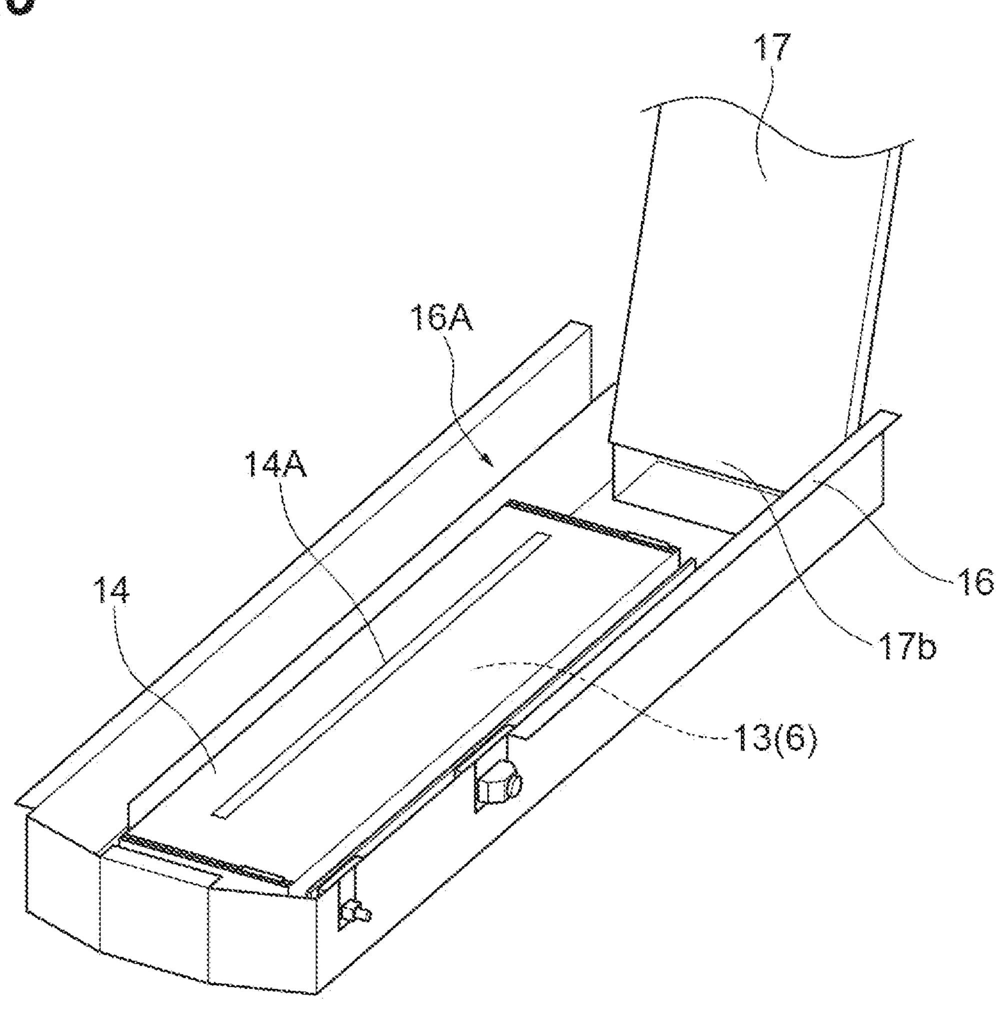
FIG. 6 is a perspective view illustrating the housing part and the duct.

As illustrated in FIGS. 5 and 6, the sensor box 14 is housed in a housing part 15. The housing part 15 is disposed below the conveyance unit 4. In the housing part 15, a hood member 16 is disposed around the sensor box 14. The hood member 16 forms a flow path 16A of cold air supplied from the cold air blower 9. The cold air is guided to the housing part 15 via a duct 17. The duct 17 is connected to a rear portion of the housing part 15.

Figure 3:
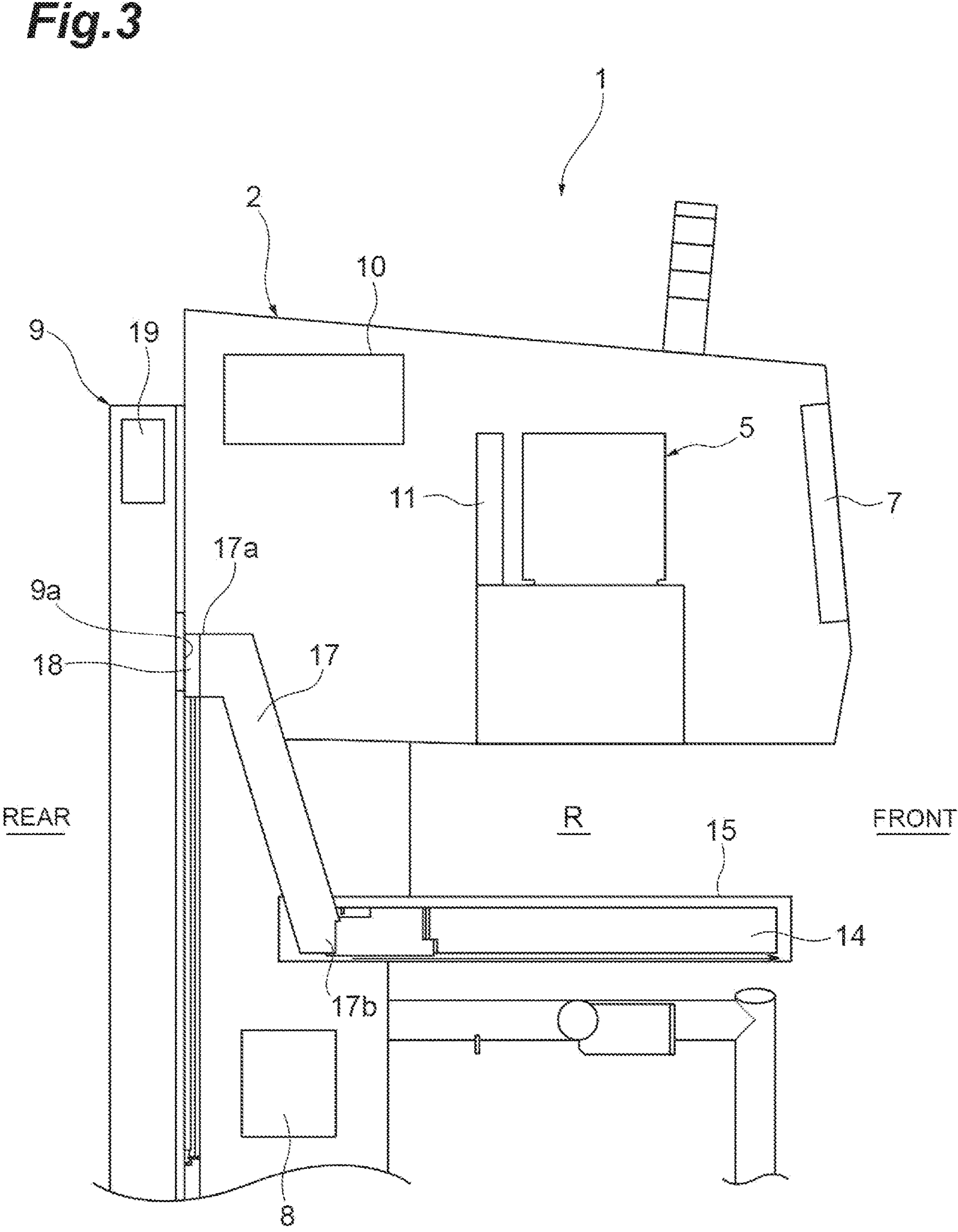
FIG. 3 is a view illustrating a configuration of the X-ray inspection apparatus in FIG. 1 from a side surface side.
Figure 4:
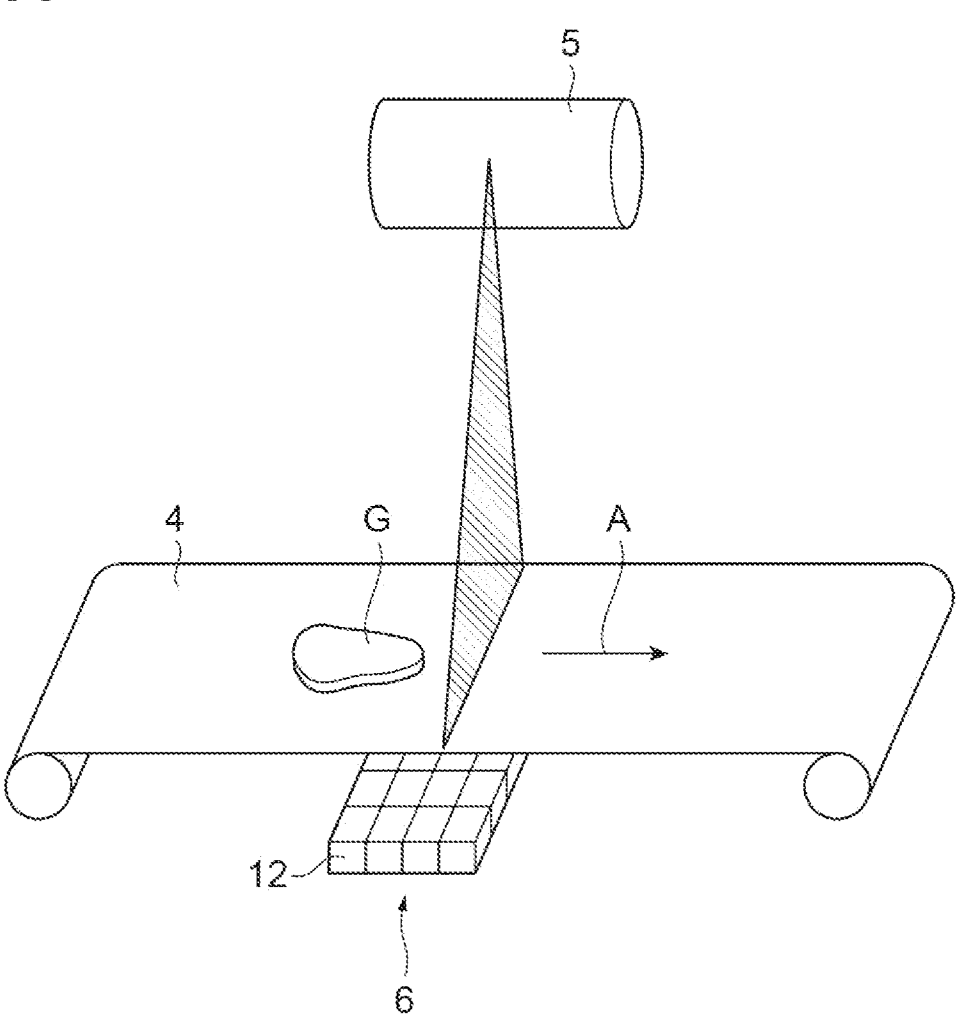
FIG. 4 is a perspective view illustrating the inside of a housing of the X-ray inspection apparatus in FIG. 1.

As illustrated in FIG. 3, the display operation unit 7 is provided on the housing 2. The display operation unit 7 displays various types of information and receives inputs of various conditions. The display operation unit 7 is, for example, a liquid crystal display and displays an operation screen as a touch panel.

As illustrated in FIG. 3, the control unit 8 is disposed inside housing 2. The control unit 8 controls the operation of each part of the X-ray inspection apparatus 1. The control unit 8 includes a central processing unit (CPU), a read only memory (ROM), a random access memory (RAM), and the like. A detection result of an X-ray in a low energy band and a detection result of an X-ray in a high energy band are input to the control unit 8 from the sensor 12 (see FIG. 4) of the X-ray detection unit 6. The control unit 8 functions as the inspection unit that generates an X-ray transmission image on the basis of the detection result of the X-ray in the low energy band and the detection result of the X-ray in the high energy band and inspects the article G on the basis of the X-ray transmission image.

Figure 2:
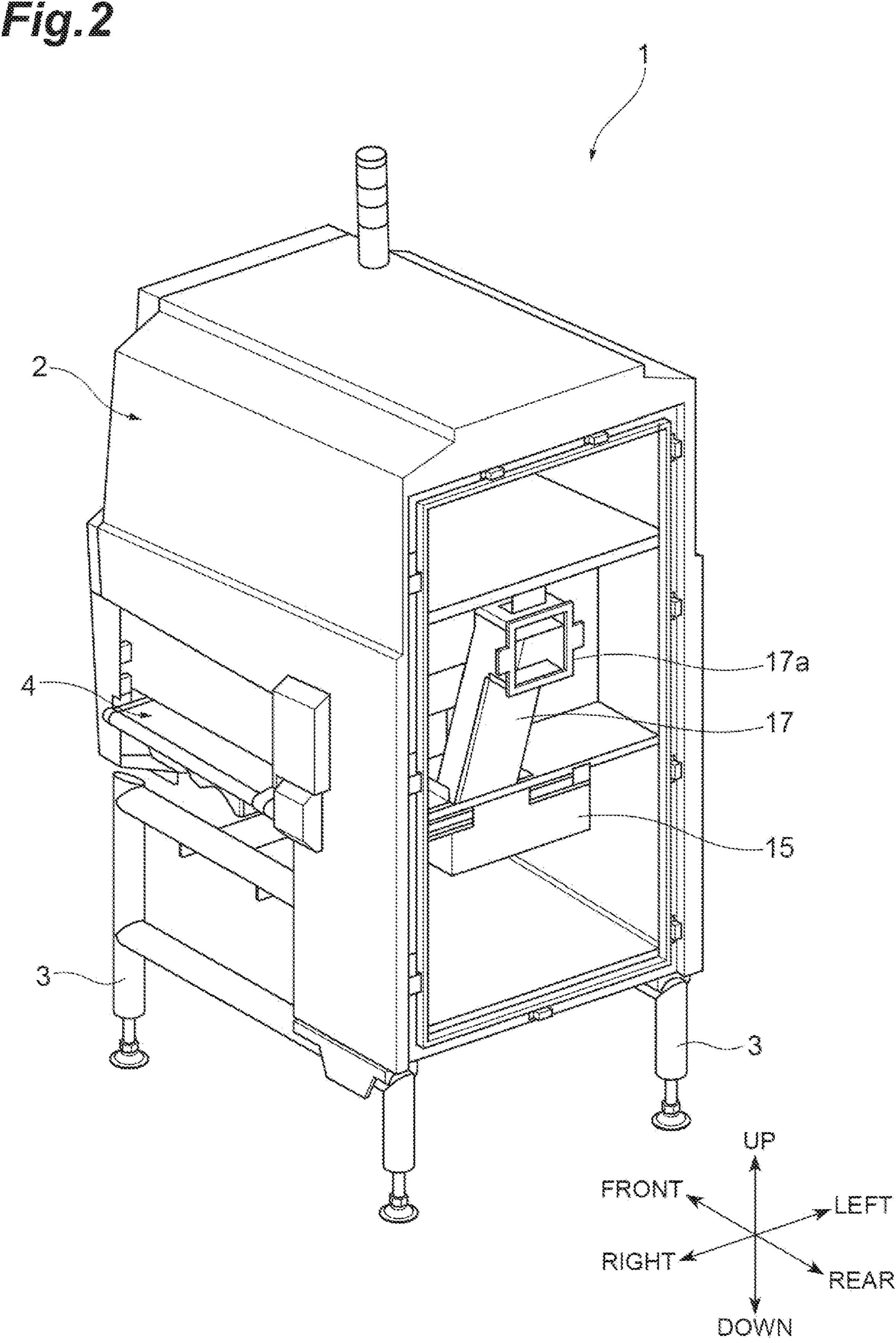
FIG. 2 is a perspective view of the X-ray inspection apparatus illustrated in FIG. 1 in a state in which a rear door is opened.

As illustrated in FIGS. 1 and 2, the cold air blower 9 is disposed on a rear surface of the X-ray inspection apparatus 1. In the present embodiment, the cold air blower 9 is attached to a door 2*a* that enables the housing 2 to be opened and closed. The cold air blower 9 is, for example, a cooler. The cold air blower 9 sucks air inside the housing 2, exchanges heat with the sucked air in a heat exchanger (not shown), and generates air (cold air) cooled by the heat exchange. The cold air blower 9 generates cold air by inside air circulation. The cold air blower 9 supplies the cold air to the housing part 15 via the duct 17.

The duct 17 is attached in the housing 2. One end 17*a* of the duct 17 is connected to a supply port 9*a* of the cold air blower 9. The one end 17*a* of the duct 17 opens rearward.

The one end 17*a* of the duct 17 is connected to the supply port 9*a* of the cold air blower 9 with the door 2*a* closed. A fan 18 is provided between the supply port 9*a* of the cold air blower 9 and the one end 17*a* of the duct 17. The fan 18 blows the cold air supplied from the cold air blower 9 to the duct 17. The other end 17*b* of the duct 17 is connected to the housing part 15.

As illustrated in FIG. 3, the cold air blower 9 includes a monitoring unit 19. The monitoring unit 19 monitors a state of the cold air blower 9.

The monitoring unit 19 includes a CPU, a ROM, a RAM, and the like. The monitoring unit 19 is communicably connected to the control unit 8. The monitoring unit 19 inputs various types of information related to the operation of the cold air blower 9, monitors the state of the cold air blower 9, and detects an abnormality in the cold air blower 9. The monitoring unit 19 detects, for example, a temperature abnormality in a temperature sensor (not illustrated) of the cold air blower 9, a current abnormality in a compressor of the cold air blower 9, and the like. When detecting an abnormality, the monitoring unit 19 outputs an error signal to the control unit 8.

The power supply unit 10 supplies electric power to each part (X-ray detection unit 6 and the like) of the X-ray inspection apparatus 1. The power supply unit 10 and each part are connected by a power cable (not illustrated). The control unit 8 controls whether the electric power is supplied from the power supply unit 10 to each part. The power supply unit 10 is supplied with electric power from an external power supply.

As illustrated in FIG. 1, the X-ray inspection apparatus 1 includes a discharge unit 20. The discharge unit 20 discharges water generated in the housing 2 to the outside of the housing 2. The discharge unit 20 is provided on the housing 2. The discharge unit 20 is disposed, for example, below the cold air blower 9. A check valve 21 is provided at the discharge unit 20. The check valve 21 suppresses the inflow of air outside the housing 2 into the housing 2 via the discharge unit 20. In the discharge unit 20, a sealing part (not illustrated) is provided at a portion connecting to the housing 2. The sealing part is formed of a material such as rubber. The sealing part can suppress the inflow of the outside air into the housing 2 from between the housing 2 and the discharge unit 20.

Next, a flow of the cold air supplied from the cold air blower 9 will be described. The cold air supplied from the cold air blower 9 is supplied from the supply port 9*a* of the cold air blower 9 to the duct 17. The cold air supplied to the duct 17 flows into the housing part 15. As illustrated in FIG. 5, the cold air having flowed into the housing part 15 flows into the lower side of the sensor box 14 from the opening at the rear of the sensor box 14, flows forward in the sensor box 14, is exhausted from the opening at the front, and flows rearward in the flow path 16A formed by the hood member 16. The cold air flowing through the flow path 16A takes heat from the X-ray detection unit 13 housed in the sensor box 14. Air (warm air) whose temperature has increased is exhausted into the housing 2 from the rear of the flow path 16A.

Next, the operation of the X-ray inspection apparatus 1 will be described. In the X-ray inspection apparatus 1, when the error signal is output from the monitoring unit 19, that is, when the abnormality in the cold air blower 9 is detected, the control unit 8 stops the supply of the electric power from the power supply unit 10 to the X-ray detection unit 13. In other words, when the abnormality in the cold air blower 9 is detected, the control unit 8 stops the supply of the electric power to the X-ray detection unit 6, and turns off a power supply of the X-ray detection unit 6. As a result, the X-ray detection unit 6 stops the detection of the X-ray.

When the error signal is output from the monitoring unit 19, the control unit 8 stops the operation of the fan 18. In other words, when the abnormality in the cold air blower 9 is detected, the control unit 8 stops the blowing of air to the X-ray detection unit 6. When the error signal is output from the monitoring unit 19, the control unit 8 stops the irradiation of the X-ray by the X-ray irradiation unit 5. In the present embodiment, when the error signal is output from the monitoring unit 19, the control unit 8 turns off a power supply of the X-ray irradiation unit 5. When the error signal is output from the monitoring unit 19, the control unit 8 stops the conveyance of the article G in the conveyance unit 4. In the present embodiment, when the error signal is output from the monitoring unit 19, the control unit 8 turns off a power supply of the conveyance unit 4.

In the X-ray inspection apparatus 1, for example, when an error in the cold air blower 9 is eliminated, each part (conveyance unit 4, X-ray irradiation unit 5, and X-ray detection unit 6) resumes operation in response to the operation of an operator on the display operation unit 7.

As described above, in the X-ray inspection apparatus 1 according to the present embodiment, in a case where the abnormality in the cold air blower 9 is detected in the monitoring unit 19, the control unit 8 stops the supply of the electric power to the X-ray detection unit 6. The control unit 8 stops (cuts off) the supply of the electric power from the power supply unit 10 of the X-ray inspection apparatus 1 to the X-ray detection unit 6. As a result, in the X-ray inspection apparatus 1, it is possible to suppress that the X-ray detection unit 6 has a high temperature because even if some abnormality occurs in the cold air blower 9 and the cold air can no longer be supplied from the cold air blower 9, the operation of the X-ray detection unit 6 is stopped. Therefore, in the X-ray inspection apparatus 1, it is possible to suppress the occurrence of a defect in the X-ray detection unit 6 in a configuration in which the X-ray detection unit 6 is cooled.

In the X-ray inspection apparatus 1 according to the present embodiment, the cold air blower 9 cools the air in the housing 2 by the inside air circulation to generate the cold air. The X-ray inspection apparatus 1 includes the discharge unit 20 that discharges the water generated in the housing 2 to the outside of the housing 2. The discharge unit 20 includes the sealing part and the check valve 21 that suppress the inflow of the outside air into the housing 2. In the configuration in which the X-ray detection unit 6 is cooled, the cold air supplied from the cold air blower 9 is dehumidified by the heat exchange when the air is cooled. Accordingly, an environment where the X-ray detection unit 6 to which the cold air is guided, a member around the X-ray detection unit 6, and the like (housing part 15, hood member 16, and the like) are disposed is in a low humidity state (dry state). In this state, when insufficiently cooled air (moisture-containing air) is guided to the X-ray detection unit 6 whose temperature is lowered, dew condensation may occur on the X-ray detection unit 6, the member around the X-ray detection unit 6, and the like.

In a configuration including the sealing part and the check valve 21 in the X-ray inspection apparatus 1, it is possible to suppress the inflow of air having a high temperature and humidity into the housing 2 via the discharge unit 20. Therefore, in the X-ray inspection apparatus 1, it is possible to suppress the occurrence of dew condensation on the X-ray detection unit 6, the member around the X-ray detection unit 6, and the like due to the air. Therefore, in the X-ray inspection apparatus 1, it is possible to suppress the ingress of water generated by dew condensation into the X-ray detection unit 6. As a result, in the X-ray inspection apparatus 1, it is possible to suppress the occurrence of a defect in the X-ray detection unit 6 in the configuration in which the X-ray detection unit 6 is cooled.

In the X-ray inspection apparatus 1 according to the present embodiment, in a case where the abnormality in the cold air blower 9 is detected in the monitoring unit 19, the blowing of the air to the X-ray detection unit 6 is stopped. In this configuration, in a case where any abnormality occurs in the cold air blower 9 and the cold air can no longer be supplied from the cold air blower 9, insufficiently cooled air is not guided to the X-ray detection unit 6. Accordingly, in the X-ray inspection apparatus 1, it is possible to suppress the occurrence of dew condensation on the X-ray detection unit 6 and the like. Therefore, in the X-ray inspection apparatus 1, it is possible to suppress the ingress of water generated by dew condensation into the X-ray detection unit 6. As a result, in the X-ray inspection apparatus 1, it is possible to suppress the occurrence of a defect in the X-ray detection unit 6 in the configuration in which the X-ray detection unit 6 is cooled.

In the X-ray inspection apparatus 1 according to the present embodiment, the hood member 16 is disposed around the sensor box 14. As illustrated in FIG. 5, the hood member 16 forms the flow path 16A for the cold air supplied from the cold air blower 9. As a result, the cold air having flowered into the housing part 15 flows rearward in the flow path 16A formed by the hood member 16 and is exhausted. Accordingly, the sensor box 14 can be further cooled, and the cold air supplied from the cold air blower 9 does not directly come into contact with an inner wall surface of the housing part 15. Thus, it is possible to reduce a temperature difference from the temperature of air that is outside the housing part 15 and that has a relatively high temperature, and it is possible to more prevent the occurrence of dew condensation on the housing part 15.

Although the embodiment of the present invention has been described above, the present invention is not necessarily limited to the embodiment described above, and various modifications can be made without departing from the gist thereof.

In the above embodiment, a mode in which the power supply of the X-ray detection unit 13 (X-ray detection unit 6) is turned on and off according to the supply of the electric power from the power supply unit 10 has been described as an example. In other words, the X-ray detection unit 13 according to the above embodiment does not have the function of turning on and off the power supply of the X-ray detection unit 13. However, an X-ray detection unit 13 may include a power supply unit. In this configuration, when an error signal is output from a monitoring unit 19, that is, when an abnormality in a cold air blower 9 is detected, a control unit 8 outputs an off signal instructing to turn off a power supply to a power supply unit of the X-ray detection unit 13. When the off signal is output from the control unit 8, the power supply unit of the X-ray detection unit 13 turns off the power supply. As a result, the supply of electric power from a power supply unit 10 to an X-ray detection unit 6 is stopped, and the X-ray detection unit 6 stops the detection of an X-ray.

Figure 7:
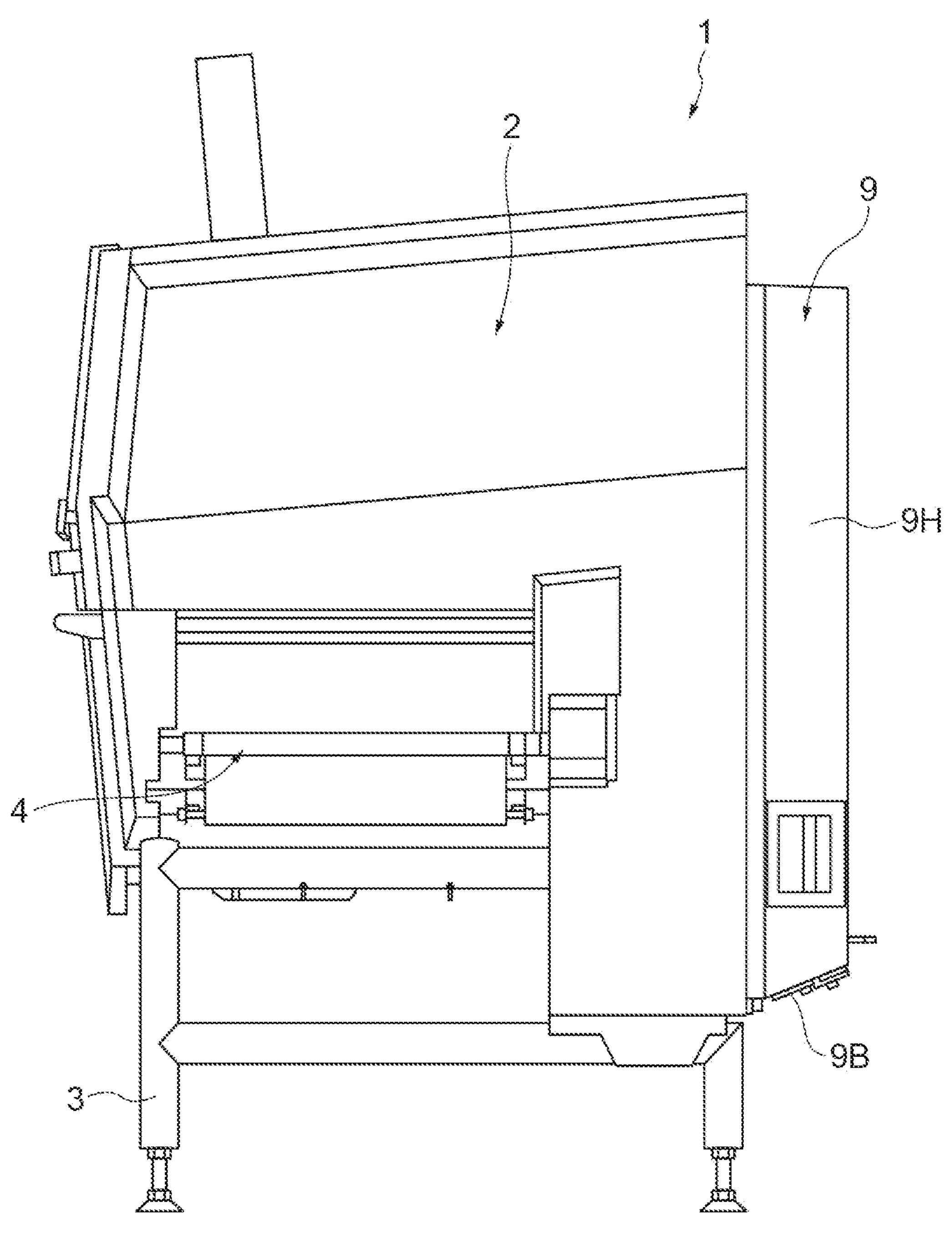
FIG. 7 is a side view of an X-ray inspection apparatus according to another embodiment.
Figure 8:
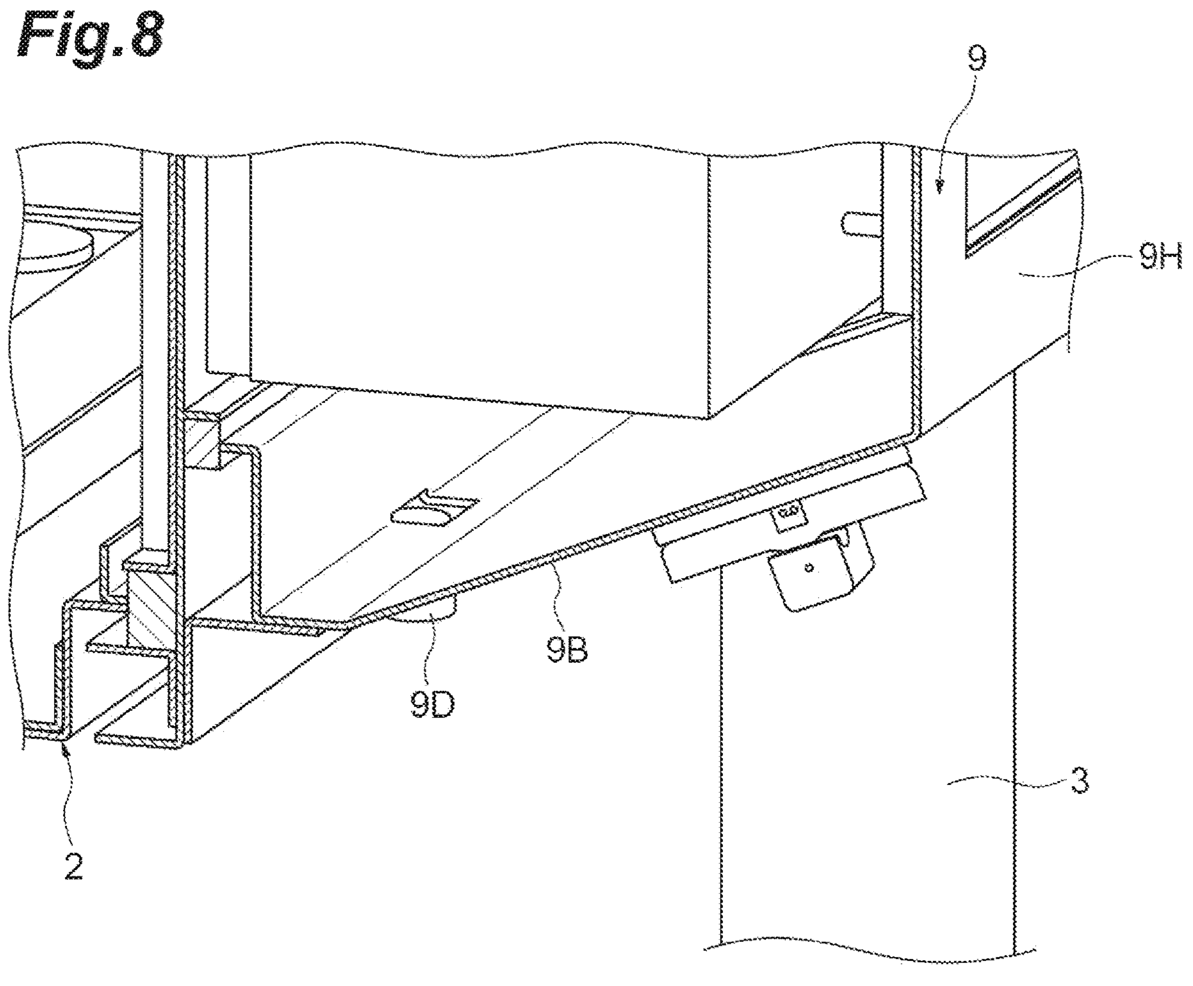
FIG. 8 is an enlarged cross-sectional view of a part of the X-ray inspection apparatus illustrated in FIG. 7.

In the above embodiment, as illustrated in FIG. 1, a mode in which a lower portion of a housing of the cold air blower 9 is flat has been described as an example. However, as illustrated in FIGS. 7 and 8, a bottom portion 9B constituting a lower portion of a housing 9H of a cold air blower 9 may be inclined. In an example illustrated in FIGS. 7 and 8, the bottom portion 9B is inclined downward toward a housing 2. A discharge unit (discharge hole) 9D is provided at the lowermost portion of the bottom portion 9B. As a result, it is possible to suppress the accumulation of water generated in the housing 9H in the lower portion of the housing 9H, and it is possible to discharge the water to the outside of the housing 9H.

Figure 9:
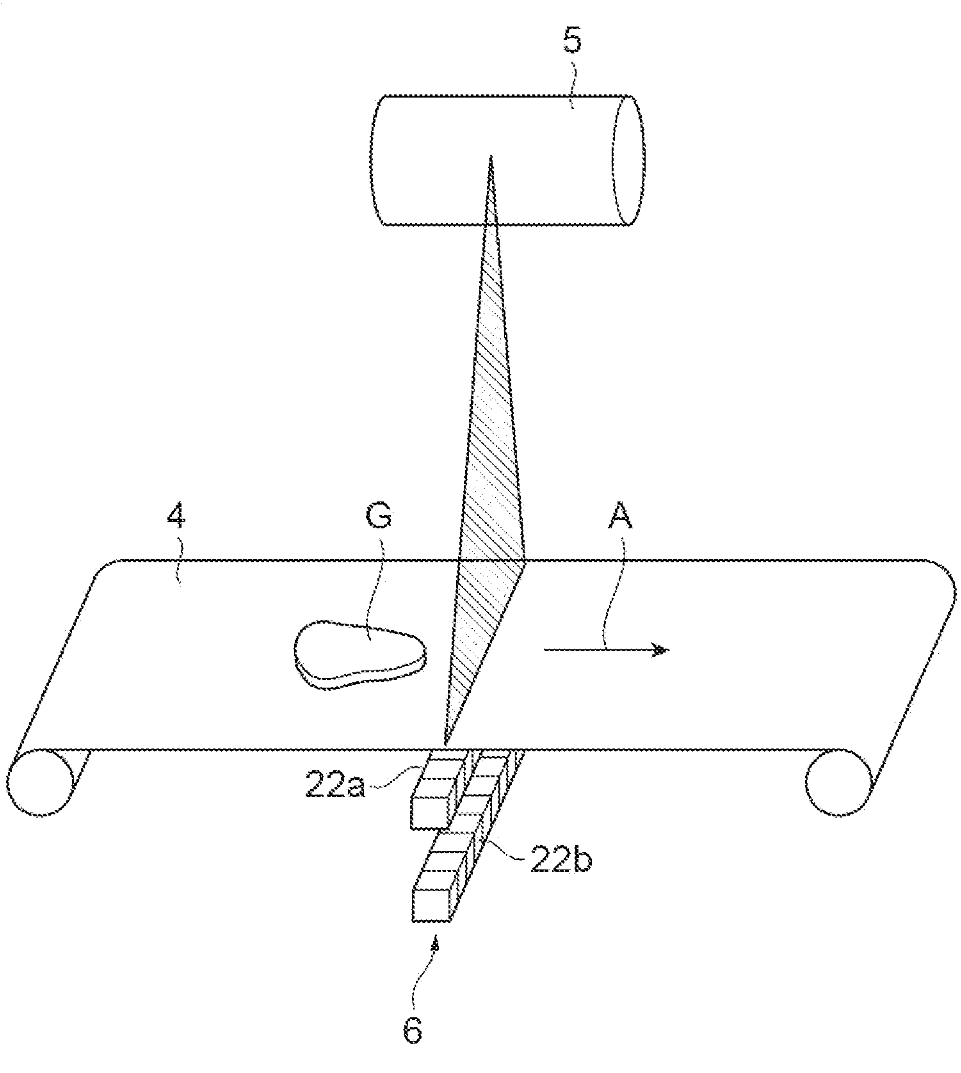
FIG. 9 is a perspective view illustrating the inside of a housing of an X-ray inspection apparatus according to another embodiment.

In the above embodiment, a mode in which the X-ray detection unit 6 is a so-called photon counting type sensor has been described as an example. However, as illustrated in FIG. 9, an X-ray detection unit 6 may include a first line sensor **22*a* and a second line sensor 22*b*. Each of the first line sensor 22*a* and the second line sensor 22*b* includes X-ray detection elements (not illustrated) one-dimensionally arranged along a horizontal direction perpendicular to a conveyance direction A. The first line sensor 22*a* detects an X-ray in a low energy band that has transmitted through an article G and a conveyance belt of a conveyance unit 4. The second line sensor 22*b* detects an X-ray in a high energy band that transmitted through the article G, the conveyance belt of the conveyance unit 4, and the first line sensor 22*a***.

In addition, an X-ray detection unit 6 may have a configuration including one line sensor or may use another sensor.

In the above embodiment and modifications, a mode in which the X-ray detection unit 6 is configured as the X-ray detection unit 13 has been described as an example. However, a sensor 12 and a control board may be disposed at different positions.

In the above embodiment and modifications, a mode in which, in a case where the abnormality in the cold air blower 9 is detected in the monitoring unit 19, the power supply of the X-ray irradiation unit 5 is turned off in order to stop the irradiation of the X-ray by the X-ray irradiation unit 5 has been described as an example. However, in a case where an abnormality in a cold air blower 9 is detected in a monitoring unit 19 in an X-ray inspection apparatus 1, it suffices that the irradiation of an X-ray by an X-ray irradiation unit 5 is stopped.

In the above embodiment and modifications, a mode in which, in a case where the abnormality in the cold air blower 9 is detected in the monitoring unit 19, the conveyance of the article G by the conveyance unit 4 is stopped has been described as an example. However, in a case where an abnormality in a cold air blower 9 is detected in a monitoring unit 19, the conveyance of an article G by a conveyance unit 4 may be continued. When the operation of the conveyance unit 4 is stopped due to the occurrence of the abnormality in the cold air blower 9, the article G is left in the X-ray inspection apparatus 1, and it may become impossible to determine whether the article G has been inspected. Accordingly, since the article G may have to be discarded, a disposal loss may occur. In a configuration in which, in a case where the abnormality in the cold air blower 9 is detected in the monitoring unit 19, the conveyance of the article G by the conveyance unit 4 is continued, it is possible to avoid that the article G is left in an X-ray inspection apparatus 1. Thus, it is possible to avoid the occurrence of a waste loss. In addition, in the X-ray inspection apparatus 1, the conveyance by the conveyance unit 4 is continued, whereby, for example, it is possible to continue an inspection until an X-ray detection unit 6 has a predetermined temperature and during that time, it is possible to cope with the abnormality in the cold air blower 9. Therefore, in the X-ray inspection apparatus 1, it is possible to continue the operation of a line on which the article G is processed.

In the above embodiment and modifications, a mode in which the cold air blower 9 is provided on the door 2*a* capable of opening and closing the inside of the housing 2 has been described as an example. However, a cold air blower 9 may be disposed inside a housing 2. In addition, cold air may be supplied from a cold air blower 9 disposed outside a housing 2 to a duct 17 via a duct or the like.

What is claimed is:

1. An X-ray inspection apparatus comprising:

a conveyance unit configured to convey an article;

an X-ray irradiation unit configured to irradiate the article conveyed by the conveyance unit with an X-ray;

an X-ray detection unit configured to detect the X-ray having transmitted through the article;

an inspection unit configured to generate an X-ray transmission image from the X-ray detected by the X-ray detection unit, the inspection unit being configured to inspect the article on the basis of the X-ray transmission image;

a housing configured to house the X-ray irradiation unit and the X-ray detection unit;

a cold air blower configured to cool air in the housing, the cold air blower being configured to guide cold air to the X-ray detection unit via a duct;

a monitoring unit configured to monitor a state of the cold air blower; and a control unit configured to stop supply of electric power to the X-ray detection unit and to stop irradiation of the X-ray by the X-ray irradiation unit in a case where an abnormality in the cold air blower is detected in the monitoring unit.

2. The X-ray inspection apparatus according to claim 1, wherein the cold air blower is configured to cool the air in the housing by inside air circulation to generate the cold air, a discharge unit configured to discharge water generated in the housing to the outside of the housing is included, and the discharge unit includes a sealing part or a check valve configured to suppress the inflow of outside air into the housing.

3. The X-ray inspection apparatus according to claim 1, wherein, in a case where the abnormality in the cold air blower is detected in the monitoring unit, blowing of air to the X-ray detection unit is stopped.

* * * * *